Oct. 11, 1966 R. A. ERREN 3,277,523

BEAD-FORMING MACHINE

Filed Jan. 30, 1964 4 Sheets-Sheet 1

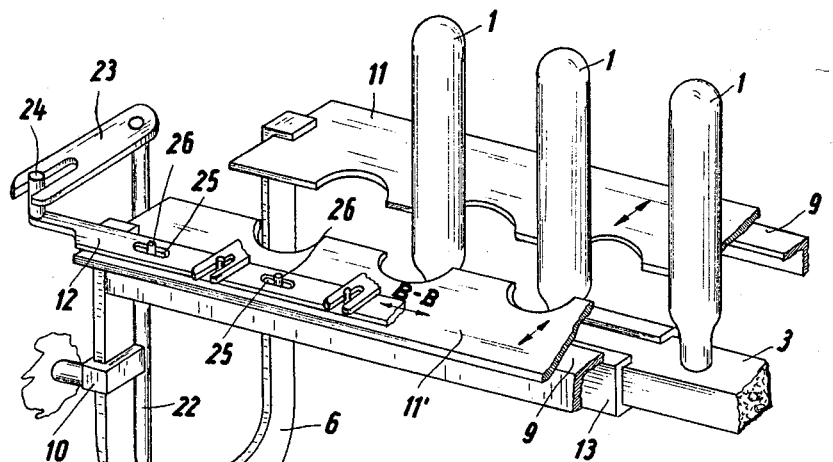
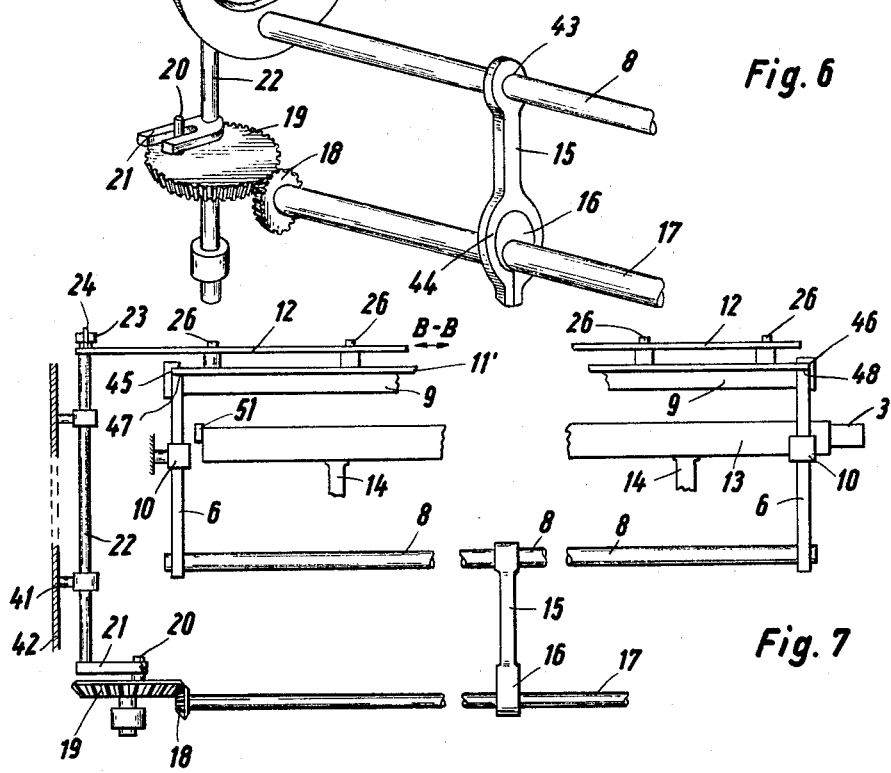

Oct. 11, 1966   R. A. ERREN   3,277,523
BEAD-FORMING MACHINE
Filed Jan. 30, 1964   4 Sheets-Sheet 3
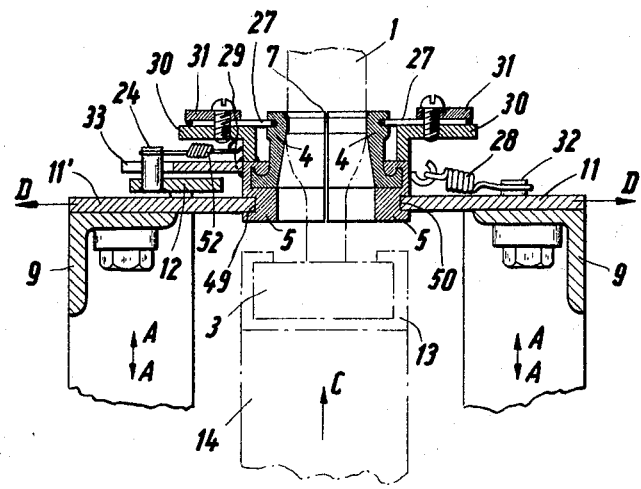
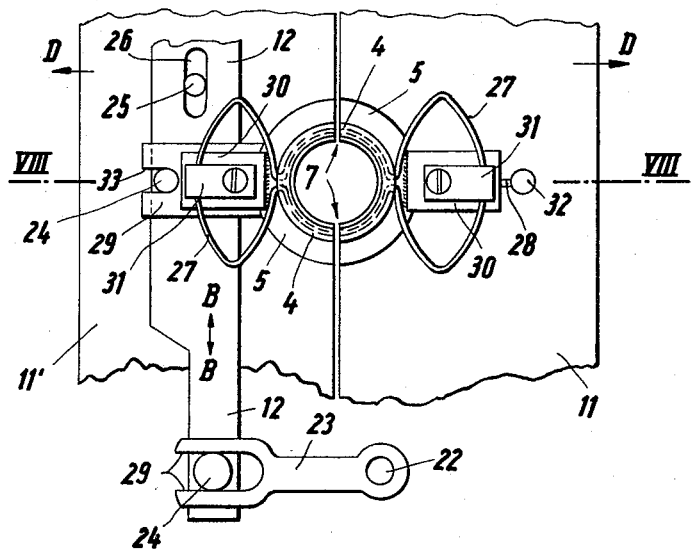

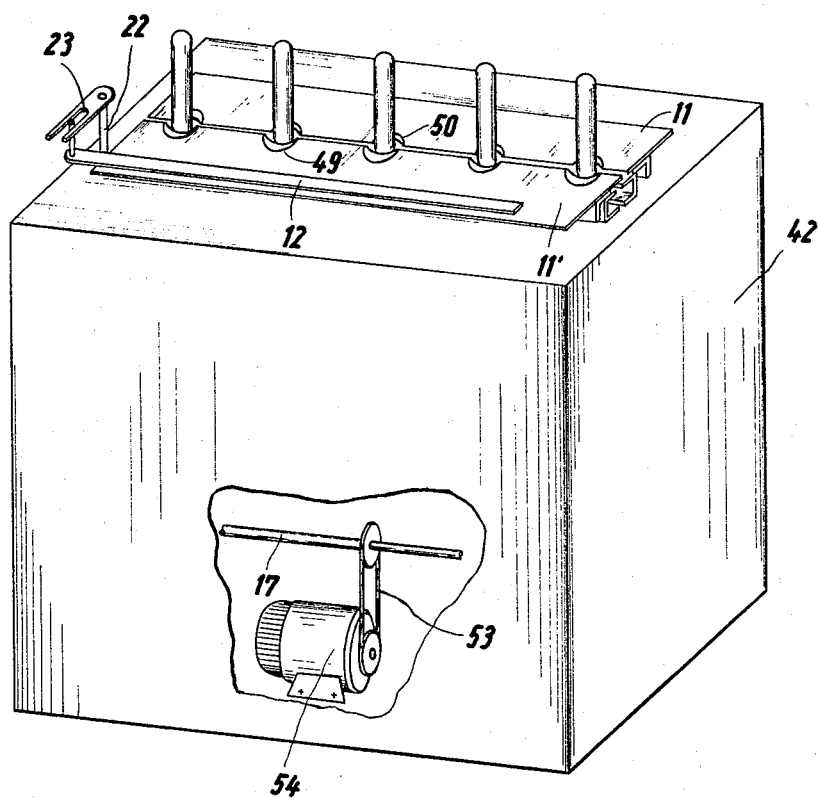

United States Patent Office 3,277,523
Patented Oct. 11, 1966

3,277,523
BEAD-FORMING MACHINE
Rudolf Arnold Erren, Hannover-Limmer, Germany, assignor to Bruno Engelhardt, Bremen, Germany
Filed Jan. 30, 1964, Ser. No. 341,232
10 Claims. (Cl. 18—2)

The invention relates to a bead-forming machine for providing a rolled edge or bead on the tapering edges of hollow articles of rubber and rubber-like materials manufactured by the dipping process, using moulds arranged on a bar with holding devices, which moulds are insertable between sets of two-part bead-forming jaws which are arranged on plates and are mutually separable perpendicular to the direction of insertion of the moulds, which jaw members can, with simultaneous movement substantially axially to the hollow articles and circumferentially thereof, be movably and resiliently pressed against them.

As bead-forming jaws, finger members are known which are resiliently constructed, for instance of rubber. According to another known construction, the bead-forming jaws have segments which are pivotally mounted on spindles, the carrier for the segments being pressed on by springs. In these known arrangements, the bead-forming jaws are pivoted about pivot points by means of the carrier supporting such jaws or by means of projections from the jaws in the form of fingers, the pivot points being remote from the operating members.

It is to be noted in this connection that, because of the cooperative movement between the bead-forming jaws and the moulds, which can be subject to vibration caused by the upper mounting, a particularly sizable moment of inertia is constituted by the supports for the bead-forming jaws relative to the moulds. In known constructions, because of the arrangement of the pivot points for the bead-forming jaw carrier remote from the moulds, excessive frictional forces are set up on pivotal movement of the bead-forming jaws about the mould members, which can lead to damage to the edges of the hollow articles.

This applies particularly if the carrier is applied in the axial direction, i.e., between the pivot point and the mould. The unilateral pressing of the half-round portion of the bead-forming jaw on one side, caused on rotation of the carrier, leads to an uneven effect of the bead-forming jaws on the circumference of the hollow article.

Known constructions have the disadvantages that all movements are exclusively carried out by the bead-forming jaws secured to corresponding tilt and pivot frames. This leads in the partially reciprocal pivoting steps to an increase in the wear of the machine and the wastage of the hollow articles, as well as to a not inconsiderable imposition upon the operator by poor compensation of the excessive vibrations.

The invention is based upon the problem of providing a bead-forming machine which provides the necessary conditions for vibration-free guiding of the bead-forming jaws on the hollow articles and improves the bead-forming process by special construction of the supporting and guiding means for the bead-forming jaws.

A further object of the invention is to provide a bead-forming machine which avoids the disadvantages of known bead-forming machines.

A further object of the invention is to provide a bead-forming machine, in which excessive pivotal movements, which can lead to undesirable vibrations, are avoided.

A further object of the invention is to avoid undesirably high frictional forces between the bead-forming jaws and the mould portions.

A further object of the invention is to provide a bead-forming machine, in which the circumference of the hollow article is acted upon uniformly.

According to the invention, the bead-forming jaws are mounted in bearings which are constructed co-axial to the hollow articles and are pivotable in the plates about the axes of the hollow articles A stiffer and so stronger bearing for the bead-forming jaws is provided with bearings extending around the circumference of the hollow articles, which ensures a uniform action of the bead-forming jaws about the whole circumference of the lower edge of the hollow article. These coaxially constructed bearings also allow rotation of the bead-forming jaws in the bearings. This is facilitated by the provision of a clearance between the bead-forming jaws in the circumferential direction.

Preferably, the driving means for moving the bead-forming jaws is constructed so as to be independent of the driving means for the lowerable holding device for the mould-carrying bar. By this separation of the driving arrangements for the advancing movement and the pivotal movements, the bead-forming step is substantially improved so as to give more delicate handling of the hollow articles and, also, the wastage of hollow articles is diminished and the operative life of the machine is increased.

According to an advantageous embodiment, the semi-tubular support-like bead-forming jaw members are mounted with their lower parts on the plates and are supported at their upper parts and held on the mould by means of a spring surrounding two associated bead-forming jaws. By this means, the supporting spring acts at a position spaced from the bearing for the bead-forming jaws, so that adjustment in this bearing is readily possible.

Advantageously, the spring includes two mutually associated half-ring portions surrounding the bead-forming jaws and expansible spring connector members. By this means, adjustment of the bearing is made possible.

According to a further advantageous feature, the bead-forming jaws are arranged on a carrier which is rotatably arranged in the plates against the action of a spring.

The spring including the spring connector elements is preferably secured to the carrier. By this means, the bead-forming jaws are guided against the edge of the hollow article in a coaxial bearing resiliently constructed independently of the supporting springs.

It may be mentioned that the bead-forming jaws are preferably made from a material with inherent elasticity, for example polyethylene. Whereas the vibratory movements of the bead-forming jaws in the axial and circumferential directions of the moulds amount only to 1 to 2 mm. and 5° to 20° respectively, the carrier for the bar is movable by an independent drive through several centimetres.

The bead-forming machine will now be described with reference to a preferred embodiment thereof, which is illustrated by way of example in the accompanying drawings.

In the drawings:

FIG. 6 shows a perspective view partly in broken-away form to illustrate the mechanism for carrying out the bead-forming movements and the arrangement of the parts;

FIG. 7 shows a side view of the arrangement shown only partially in FIG. 6, with parts broken away;

FIG. 8 shows a sectional view of a bead-forming arrangement in cross-section along the line VIII—VIII of FIG. 9, in which the driving parts are illustrated only partially;

FIG. 9 shows a plan view of a portion of the bead-forming arrangement according to FIG. 8 as a portion of a series;

FIG. 10 shows a diagrammatic perspective view of a machine with the parts described in relation to the preceding figures in which FIG. 10 shows the frame which is omitted from the other figures for better understanding.

Figure 1:
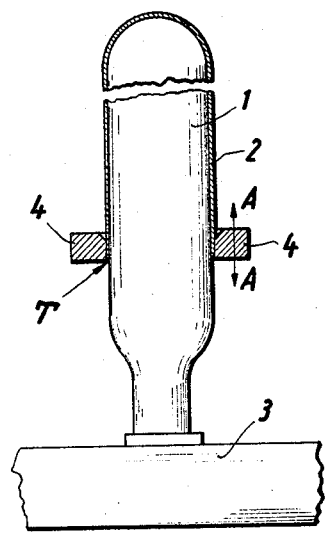
FIG. 1 shows a mould with a coating layer shown in section and diagrammatically indicated bead-forming members.

The basic operational steps are described first below with reference to FIGS. 1 and 2. In these figures, 1 is a mould for the dipping process and is made of glass, metal or synthetic plastics materials. A number of moulds 1 are secured side-by-side on a bar-like member 3 constructed as a mould carrier. After the dipping step, each mould 1 is covered with a layer 2 of the material, which forms the eventual hollow article, and this, as shown on an enlarged scale in FIG. 1, includes at a particular portion T a gradually tapering part, namely at the level to which the previously downwardly-directed mould was inserted in the latex liquid. At this portion, the mould 1 is surrounded in the machine by bead-forming jaws, for example, the two bead-forming jaw members 4, such jaws 4 being firmly but resiliently held against its wall portion, with two or (depending upon the number of jaw segments) more small gaps 7 left free between them.

To carry out the bead-forming process, relative movement must take place between the jaws 4 and the mould 1. In a practical arrangement, this can occur either with the mould stationary and by axial movement of the jaws in the direction A—A or with the jaws stationary and by axial movement of the mould. The first-mentioned way, which is that shown in the drawings, has proved to be preferable in practice.

Figure 2:
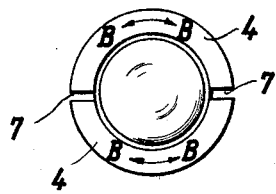
FIG. 2 shows a plan view of FIG. 1.

The jaws 4 resiliently contacting the edge of the latex coating on the mould 1 are subjected, simultaneously to the axial movement, to an oscillating rotary movement concentric to the mould, which is indicated in FIG. 2 by the double arrow B—B. Clearly, the rotary movement, in contrast to the example shown and described, can alternatively be effected with the jaws stationary and the mould 1 moving; however, such an arrangement of the machine requires essentially greater space.

Figure 5:
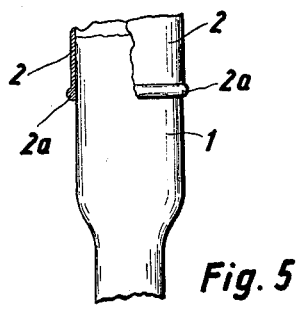
FIG. 5 shows a fragmentary view corresponding to FIG. 1 with a rolled beaded edge formed on the coating layer.

In FIG. 5, a mould 1 is shown partially, with the lower beaded edge portion of the latex coating formed as a roll or bead after treatment by the bead-forming machine, which bead is indicated in this figure at 2a. In the further steps of the method, after minimising the adhesiveness of the latex coating by treatment with a powder, the layer 2 is rolled up, starting from the bead, 2a uniformly upon the mould 1. This can be carried out by hand or advantageously by means of special known machines.

Figure 3:
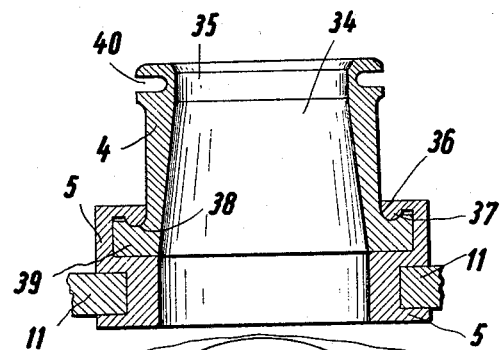
FIG. 3 shows a front elevational view of half of a set of bead-forming jaws according to the invention, seen in the concave portion of the bead-forming tool.
Figure 4:
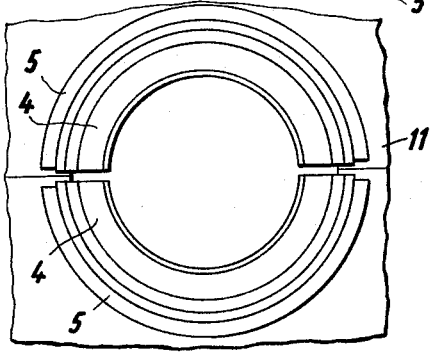
FIG. 4 shows a plan view of a bead-forming arrangement with bead-forming members according to FIG. 3.

In FIG. 3, on an enlarged scale, a jaw 4 surrounding for example about 178° is shown in front view on its front edge with a suitable mould, and FIG. 4 shows a pair of such jaws in plan view. It can readily be seen from FIG. 3 how the actual bead-forming jaw 4 is held for example in an advantageous way by means of a carrier 5 constructed as a metal ring, which is likewise divided into two halves and is itself located in the bead-forming machine.

It is essential that the bead-forming jaws 4 are made in half-tubular form. The inside cavity 34 converges upwardly in cross-section to the portion serving as the bead-forming edge 35.

It is to be noted that the carrier 5 has an inwardly-directed annular flange 36, which has on its inside end a downwardly-directed rim 37. This rim engages in a correspondingly-profiled groove 38 in the flange-like outer widened foot portion 39 of the bead-forming jaw 4. The arrangement is advantageously made so that clearance is present between the parts. At the outside, the bead-forming jaws have, at the level of the edge 35, an annular groove 40 for engagement by spring members moved at a later stage, which guide the upper part of the bead-forming jaws, a slight yielding in the lower support being desirable.

There is also the possibility of constructing the bead-forming jaws 4 from a weakly elastic material, such as a plastics material.

In FIG. 6, the general arrangement is shown diagrammatically in illustrative form and partial perspective view and FIG. 7 shows the same arrangement in projection. From these figures, the operation of the machine can be seen, the drive preferably being taken from a main shaft and transmission of the drive to the various moving parts being provided by any means known in the art.

In FIG. 6, a U-shaped carrier member 6 for the bead-forming members 4 is shown, together with a carrier device 13 for the bar 3. The carrier 13 consists of a U-section channel, for example, with its open side directed upwardly, and the upper edges of its side webs being curved inwardly, so that they engage the bar 3. The carriers 6, at least two in number, are firmly connected together, for example by means of crossbar 8 and head rails 9 and are mounted in known manner for vertical movement between limits, for example, in guides 10 which are rigidly arranged at 41 on the machine frame 42 (FIG. 10). By means of one or two connecting rods 15, the whole of the bead-forming devices, resting on the carriers 6 or their head rails 9, can undergo vertical reciprocation movements, by means of an eccentric 16, by rotation of a main shaft 17, with respect to the carrier device 13 and as also with respect to the bar 3, the stroke of these movements being determined only by the eccentric 16, which can be constructed if required with an adjustable throw.

It can be seen that the carrier device 13 is supported by struts 14 which are mounted in the machine frame in a manner not shown in detail.

The crossbar 8 is mounted in a bearing opening 43 in the connecting rod 15 and surrounds, with another bearing opening 44, the other end of the eccentric 16 so that support for the carrier 6 is provided.

Plates 11 and 11' are arranged on the head rails 19, which rigidly connect together the carrier members 6, so that they can be moved parallel to one another in guides. This movement is effected in any suitable way by hand, for example, by means of a lever arrangement (not shown). The movement in the opening direction is indicated in FIGS. 8 and 9 by arrows D.

To carry out the above-mentioned movement, the upper ends of the carrier members are provided at 45 and 46 (FIG. 7), for instance, with overlapping clamping devices, which engage the upper edges of the plates 11 and 11', which are supported with their lower sides on the end portions 47, 48 of the separate limbs of the carrier members 6. For this purpose, the carrier members 6, as shown particularly in FIG. 6, have a rectangular cross-section which extends at right-angles to the machine.

As shown by way of example in FIGS. 8 and 9, the plates 11, 11' carry the bead-forming jaws, which are rotatably inserted with their carriers 5 in semicircular notches 49, 50 in the plates 11, 11'. By this means, each two bead-forming jaws 4 stand opposite one another in the plates 11, 11' and the number and spacing of the pairs of bead formers correspond to the number of moulds provided on the bar 3 and their mutual spacing.

At the beginning of the bead-forming process, the plates 11, 11' are forced apart in the direction of the arrows D, so that in these positions of the plates the bar 3 with the moulds 1 is raised from one end of the machine between the open pairs of bead-forming jaws, i.e., inserted in the carrier device 13 as can be seen in FIG. 6. As soon as the bar 3 is disposed in its preferred operating position as determined by abutments 51, the plates 11, 11′ are pushed together so that the bead-forming jaws of each pair surround one of the moulds 1.

The carrier 5 is not mounted rigidly in the notches in the plates 11, 11′, but is rotatable about its central point through a few degrees.

An illustrative practical arrangement of the bead-forming jaws is shown diagrammatically in FIGS. 8 and 9 in section and elevation.

With this operative application of the bead-forming jaws, the jaw holder 5 mounted in the notch in the plate 11 is held there by tension springs 28 which are secured to pins 32 in the plate 11. The springs 28 pull the holder 5 firmly into the semicircular notch 50 in the plate 11 and hold it there so that it cannot slide out, but so that it is not held against slight rotary movements. The holders 5 for the jaws 4 on the opposite plate 11′ are similarly rotatably mounted in the semicircular notch 49 in the plate 11′ and rigidly connected with arms 29 which in their turn have slots 33 on their free ends. Over the whole length of the plate 11′ carrying the jaws 4, there extends a connecting rod 12 which is provided with pins 24, so that one of the pins 24 engages in each of the slots 33. The connecting rod 12 is guided on the plate 11′ so that it can move within certain limits in the direction with slots 25 in which pins 26 rigidly mounted on the of the arrows B—B. The connecting rod 12 is provided plate 11′ engage. The connection rod 12 can slide on the plate 11′, for example, or it can be supported by small bearings.

A spring 52 corresponding to the spring 28 is provided, for example, as shown in FIG. 8, between the pins 24 and the associated holder 5 or one of the associated angle arms 30.

If the connecting rod 12 is subjected to reciprocal movement over a small distance, the arms 29, the pins 24 and the holder 5 for the plate 11′ are subjected to pivotal movements in the notches in the plate 11′ and the opposite holder for the plate 11 takes part in similar movements, so that this undergoes similar pivotal movement. Each pair of bead-forming jaws rotates is oscillating fashion through a few degrees about the mould 1 surrounded by such pair of jaws. In this way, a uniform bead-forming action about the periphery of the mould 1 is ensured, even if the bead-forming jaws because of inaccuracies in the moulds, are not firmly applied about them or if, between the jaws of one pair of jaw members, the above-mentioned small slits or gaps 7 remain open. The reciprocal movement of the connecting rod 12 can be provided by any means known in the art, for example by the manner clearly shown in FIGS. 7, 9 and 6. As can be seen from FIGS. 6 and 7, for example, a rotating pin 20 is driven from a pair of bevel wheels 18, 19 by means of the shaft 17 so as to engage in a fork 21, which is rigidly mounted on a shaft 22 and thus subjects the shaft 22 to oscillating movements. At the other end of the shaft 22, a further fork 23 is secured, whose opening engages the pin 24, which in turn is rigidly mounted on the connecting rod 12 and subjects it to reciprocal movement in the direction of the arrows B—B. Thus the oscillating rotary movement of the pair of bead-forming jaws is provided.

The resilient pressing of the bead-forming jaws on to the moulds is effected in a way which is not hindered by the oscillating rotary movement of the bead-forming jaws and is advantageously as illustrated in FIGS. 8 and 9. Each of the holders 5 is provided with an angle arm 30, to which a spring 27 is attached by means of a screw-mounted plate 31. The spring 27 surrounds and holds the bead-forming jaws 4 and supports their upper, lightly elastically-yieldable parts which surrounds the jaws in bead-formation.

FIG. 10 shows a general view in which the outside of the machine housing frame 42 is illustrated. Otherwise, in this figure, the main shaft 17 is shown through a section of the frame. The main shaft is in connection via a transmission unit 53 with a driving motor 54. At the upper side of the housing frame, the shaft 22 (which is mounted in the adjacent frame wall corresponding to FIG. 7), the lever 23, the connecting rod 12 and the plates 11, 11′ can be seen. The construction of the connecting rod 12, its arrangement and the various bead-forming jaw parts on the plates 11, 11′ have been omitted from FIG. 10 for simplicity. From the preceding figures, it can however readily be seen how these parts are assembled in the notches 49, 50 provided in the plates 11 and 11′.

The operation takes place as follows: With the plates 11, 11′ spaced from each other and thus open, the bar 3 in the carrier device 13 supported by the struts 14 is moved in the direction C. The plates 11 and 11′ are brought closer together until the pairs of bead-forming jaws each firmly surround a mould 1. The main shaft 17 is then rotated by a driving unit (motor). This causes the carrier 6 and hence the jaw members 4 to undergo rapid reciprocal movements and simultaneounsly causes the bead-forming jaws to undergo short oscillatory rotary movements around the moulds. During this process, the carrier device 13 for the bar is lowered manually or mechanically through a few centimetres, to such an extent that the to-and-fro movement of the bead-forming jaws forms the roll or bead 2a on the hollow latex article mounted on the mould 1 and then moves it upwards.

I claim:

1. A bead-forming machine for forming beads on the edges of hollow articles of constructional materials selected from the group consisting of rubber and rubber-like materials and manufactured by the dipping process, which machine comprises, in combination, a housing frame, carrier means disposed on such frame, bar means insertable into the carrier means, substantially elongate mould members for receiving coatings by a dipping step and mounted as a row upon the bar means, a pair of plates disposed substantially perpendicular to the mould members and parallel to and one on either side of such mould members, notch means formed in the mutually opposing edges of the plates in the positions of the mould members for surrounding the associated edges and the individual mould members, support means for the plates mounted on the frame for movement substantially in a direction perpendicular to the plane of the plates, guide means disposed on the frame for guiding the support means, setting means arranged between the support means and the plates and adapted to permit movement of the plates towards and away from the mould members, bead-forming jaw members rotatably disposed within the notches, first driving means adapted to impart to the jaw members reciprocal movement in the circumferential direction of the mould members, second driving means adapted to impart to the support means a substantially oscillatory movement in the guidance direction, and bearing members disposed in the notches coaxially of the mould members and adapted to render the jaw members rotatable about the respective axes of the hollow articles.

2. The machine as set forth in claim 1, wherein the first and second driving means are operatively independent of one another.

3. The machine as set forth in claim 1, wherein the bead-forming jaw members are of half-tubular support-like form and are provided with support springs adapted to urge the upper portions of such jaw members against the mould members.

4. The machine as set forth in claim 1, wherein the bead-forming jaw members are of half-tubular support-like form and each two associated jaw members are surrounded by support spring means adapted to urge the upper portions of such jaw members against the mould members.

5. The machine as set forth in claim 1, wherein the bead-forming jaw members are of half-tubular support-like form and are provided with support springs adapted to urge the upper portions of such jaw members against the mould members and are carried upon projecting portions provided on the bearing members.

6. The machine as set forth in claim 1, wherein the bead-forming jaw members are of half-tubular support-like form and each two associated jaw members are surrounded by support spring means adapted to urge the upper portions of such jaw members against the mould members, such support spring means comprising two co-operating half-ring portions surrounding the jaw members and pivotable spring connector elements.

7. The machine as set forth in claim 1, wherein the bearing members include holders adapted for rotary movement in the notches in the plates and of substantially half-annular form, spring means being located between the holders and the associated plates for retaining such holders in the notches and permitting rotation of the holders against the action of the spring means.

8. The machine as set forth in claim 1, wherein the bearing members include holders adapted for rotary movement in the notches in the plates and of substantially half-annular form, spring means being located between the holders and the associated plates for retaining such holders in the notches and permitting rotation of the holders against the action of the spring means, each holder having an inwardly-directed annular flange provided with a semiannular bead on its inner portion and the jaw members having a flange-like outwardly enlarged foot member having a profiled-groove therein for engagement with the holder bead.

9. The machine as set forth in claim 1, wherein the upper portions of the jaw members are adapted to be movable inwardly toward the mould members.

10. The machine as set forth in claim 1, wherein the bead-forming jaw members are of half-tubular support-like form and are provided with support springs adapted to urge the upper portions of such jaw members against the mould members, such jaw members including inner recesses which converge upwardly to serve as a bead-forming edge region.

References Cited by the Examiner
UNITED STATES PATENTS

| | | | |
|---|---|---|---|
| 2,276,367 | 3/1942 | Bauer | 18—2 |
| 2,314,716 | 3/1943 | Kurkjian | 18—2 |
| 2,753,593 | 7/1956 | Duff | 18—2 |
| 2,779,055 | 1/1957 | Burger | 18—2 |

J. SPENCER OVERHOLSER, *Primary Examiner.*

W. L. McBAY, *Assistant Examiner.*